US012574301B2

(12) United States Patent
AlEryani et al.

(10) Patent No.: US 12,574,301 B2
(45) Date of Patent: Mar. 10, 2026

(54) CONFIGURING RADIO RESOURCE CONTROL TIMERS

(71) Applicant: Dell Products L.P., Round Rock, TX (US)

(72) Inventors: Yasser AlEryani, Kanata (CA); Satish Venkob, Mississauga (CA); Mostafa Mouawad, New Cairo (EG)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/757,248

(22) Filed: Jun. 27, 2024

(65) Prior Publication Data

US 2026/0005930 A1    Jan. 1, 2026

(51) Int. Cl.
H04L 41/16       (2022.01)
G06N 3/092       (2023.01)
H04W 28/18       (2009.01)

(52) U.S. Cl.
CPC ............. H04L 41/16 (2013.01); G06N 3/092 (2023.01); H04W 28/18 (2013.01)

(58) Field of Classification Search
None
See application file for complete search history.

(56)              References Cited

U.S. PATENT DOCUMENTS

| | | | | |
|---|---|---|---|---|
| 2024/0019890 A1* | 1/2024 | Ma | .............................. | G06F 1/08 |
| 2024/0049030 A1* | 2/2024 | Kim | ....................... | H04W 24/10 |
| 2025/0048267 A1* | 2/2025 | Xu | .......................... | H04W 72/23 |
| 2025/0254101 A1* | 8/2025 | Qiao | ........................ | H04W 8/22 |
| 2025/0280466 A1* | 9/2025 | Zhou | ................ | H04W 52/0206 |
| 2025/0324393 A1* | 10/2025 | Abedini | ................ | H04W 76/10 |
| 2025/0324484 A1* | 10/2025 | He | ......................... | H04W 76/28 |

* cited by examiner

*Primary Examiner* — Phuoc H Nguyen
(74) *Attorney, Agent, or Firm* — Amin, Turocy & Watson, LLP

(57)                ABSTRACT

A system can train and maintain a first deep reinforcement learning model, wherein the first deep reinforcement learning model was generated according to a first objective to improve timing of transitions from a radio resource control active state. The system can train and maintain a second deep reinforcement learning model, wherein the second deep reinforcement learning model was generated according to a second objective to improve timing of transitions from a radio resource control inactive state or a radio resource control idle state, and wherein the first deep reinforcement learning model and the second deep reinforcement learning model share an objective function. The system can determine respective timers for respective radio resource control states based on a first result of the training of the first deep reinforcement learning model and a second result of the training of the second deep reinforcement learning model.

20 Claims, 10 Drawing Sheets

700⤸

100
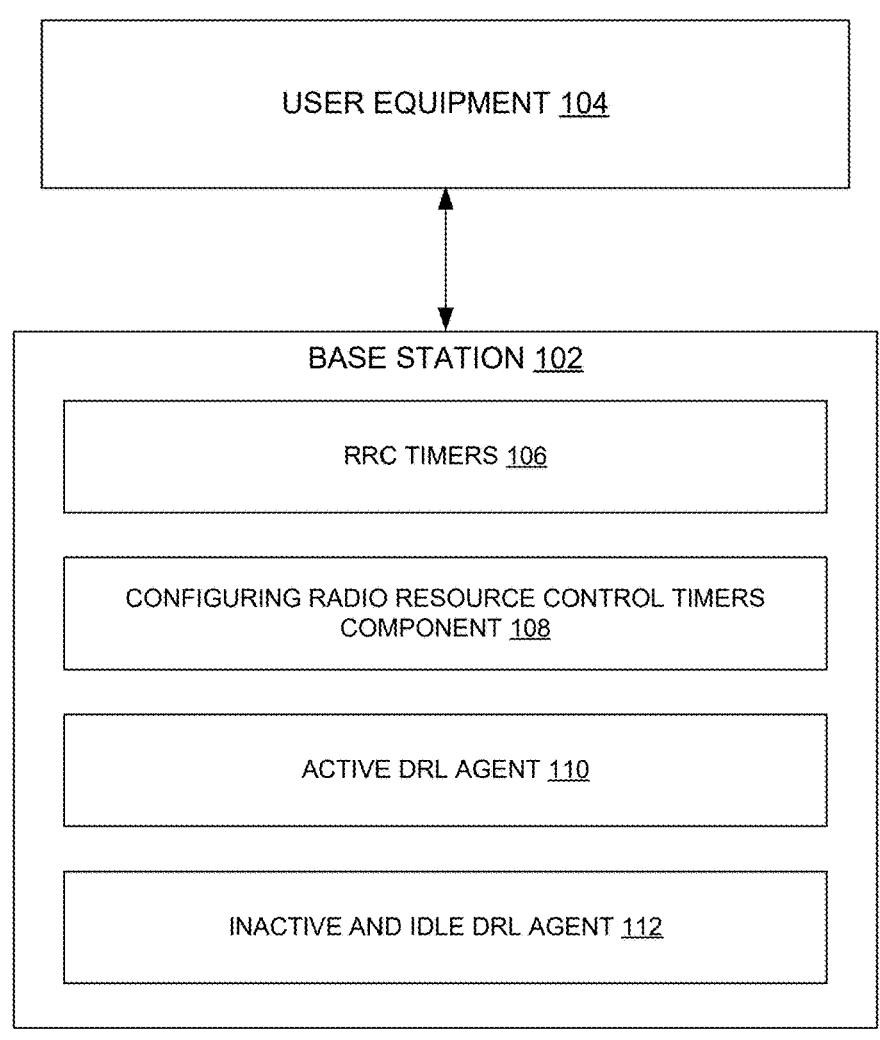
USER EQUIPMENT 104
BASE STATION 102
RRC TIMERS 106
CONFIGURING RADIO RESOURCE CONTROL TIMERS COMPONENT 108
ACTIVE DRL AGENT 110
INACTIVE AND IDLE DRL AGENT 112
FIG. 1

300

302

CONFIGURING RADIO RESOURCE CONTROL TIMERS COMPONENT 308

| Mode | Related Timers | Description | Range |
|---|---|---|---|
| RRC-CONNECTED | DRX-InactivityTimer ($T_{C1}$) | This timer is started/re-started after each PDCCH reception. | 1~10240 subframes duration |
| | C-DRX On duration ($T_{C2}$) | The time duration at which UE wake up to receive PDCCH scrambled P-RNTI | 1~64 subframes duration |
| | Short C-DRX Cycle ($T_{C3}$) | The minimum periodicity at which the UE will wake up to monitor for incoming downlink data. | 2 * defaultPagingCycle of 80 ms*$N_s$, $N_s = \{0,5,1\}$ |
| | Long C-DRX Cycle ($T_{C4}$) | Periodicity at which UE wakes up after short DRX cycles expire with no data. It appears after $K_s$ Short C-DRX Cycle. Where $K_s$ to be optimized. | 2 * defaultPagingCycle of 80 ms*$N_L$, $N_L = \{2,\ldots, 16\}$ |
| | dataInactivityTimer ($T_{C5}$) | Controls transition from RRC-CONNECTED to RRC-INACTIVE (or RRC-IDLE) due to data inactivity. Starts after last UL/DL data activity on DRBs and resets on next data activity. | 5-30 seconds |
| RRC-INACTIVE | In-DRX Cycle ($T_{IN1}$) | Periodicity at which UE wakes up after DRX period to monitor for paging messages | 2 * defaultPagingCycle of 80 ms*N |
| | pagingTimeWindow ($T_{IN2}$) | It indicates the duration of the paging monitoring window in which the UE needs to monitor for paging messages. | 1-20 subframes duration |
| | dataInactivityTimer ($T_{IN3}$) | Controls transition from RRC-INACTIVE to RRC-IDLE due to continued data inactivity. Starts at the beginning of RRC-INACTIVE mode | 10-20 minutes |
| RRC-IDLE | I-DRX ($T_{ID1}$) | Between DRX cycles, the UE can power down completely until the next cycle begins. | 2 * defaultPagingCycle of 80 ms*N |
| | pagingTimeWindow ($T_{ID2}$) | It indicates the duration of the paging monitoring window in which the UE needs to monitor for paging messages. | 1-20 subframes duration |

FIG. 3

400

CONFIGURING RADIO RESOURCE CONTROL TIMERS
COMPONENT 408

402

| DRL Item | Equivalent Design | Comment |
|---|---|---|
| Reward Function | $r_1$ $= w_1(-La\ Penalty)$ $+ w_2(EE\ Improvement)$ $+ w_3(-SO\ Penalty)$ | $w_1 + w_2 + w_3 = 1$ With $0 \leq w_i \leq 1, \forall i = 1, ..., 3.$ |
| Action Space | $a_1 = [T_{IN_1}, T_{IN_2}, T_{IN_3}, T_{IN_4}, T_{IN_5}]$ | |
| State Space | $S_1 = \{RRC\ Con.\ mode, UE\ Battery\ Life\}$ | |
| Activation Function | Can use advanced activation functions to capture the nuances of low-power state transitions. | These functions can introduce non-linearity and help the agent learn complex patterns. |
| DRL Algorithms | Can use Actor-Critic methods such as Asynchronous Advantage Actor-Critic (A3C) or Soft Actor-Critic (SAC) for continuous control over the timing of transitions. | Capable of handling high-dimensional state and action spaces, with experience replay and target networks to stabilize learning. |

Where:
- $La\ Penalty = La(t) - La(t-1)$,
- $EE\ Improvement = EE(t) - EE(t-1)$,
- $SO\ Penalty = SO(t) - SO(t-1)$.

FIG. 4

500

| CONFIGURING RADIO RESOURCE CONTROL TIMERS COMPONENT 508 |
| :---: |

502

| DRL Item | Equivalent Design | Comment |
| --- | --- | --- |
| Reward Function | $r_2$ <br> $= c_1[w_1(-La\ Penalty)$ <br> $+ w_2(EE\ Improvement) + w_3(-SO\ Penalty)]$ <br> $+ c_2[y_1(QoSMaintenance)$ <br> $+ w_2(UE\ Throughput)]$ <br> $= c_1 r_1 + c_2[y_1(QoSMaintenance)$ <br> $+ y_2(UE\ Throughput)]$ | $w_1 + w_2 + w_3 = 1$ <br> $y_1 + y_2 = 1$ <br> $c_1 + c_2 = 1$ <br> With <br> $0 \le w_i \le 1,$ <br> $0 \le c_j \le 1$ <br> $0 \le y_k \le 1$ <br> $\forall i = 1,...,5,\ j = 1,2,\ and\ k = 1,2.$ |
| Action Space | $a_2 = [T_{C_1}, T_{C_2}, T_{C_3}, T_{C_4}, T_{C_5}, p]$ | |
| State Space | $S_2 = \{RRC\ Con.\ mode\ , UE\ Battery\ Life\}$ | |
| Activation Function | Rectified linear units (ReLU) or leaky ReLU for the hidden layers. | These functions can introduce non-linearity and help the agent learn complex patterns. |
| DRL Algorithms | Deep Q-Networks (DQN) or Proximal Policy Optimization (PPO) | Capable of handling high-dimensional state and action spaces, with experience replay and target networks to stabilize learning. |

Where:
- $La\ Penalty = La(t) - La(t-1),$
- $EE\ Improvement = EE(t) - EE(t-1),$
- $SO\ Penalty = SO(t) - SO(t-1).$

FIG. 5

600

REPLAY BUFFER 602A ↔ RRC-ACTIVE DRL AGENT 604A $$r_2 = c_1 r_1 + c_2[y_1(QoS\,Maintenance) + y_2(UE\,Throughput)]$$

$$a_2 = [T_{C_1}, T_{C_2}, T_{C_3}, T_{C_4}, T_{C_5}, \rho]$$

$$s_2 = \{RRC\,Con.\,mode, UE\,Battery\,Life\}$$

COMBINED REWARDS 608

$$r = \{r_1, r_2\}$$

SYSTEM ENVIRONMENT 606 UE, gNB, AND PROPAGATION MEDIUM

COMBINED STATES 610

$$s = \{s_1, s_2\}$$

$$r_1 = w_1(-La\,Penalty) + w_2(EE\,Improvement) + w_3(-SO\,Penalty)$$

$$a_1 = [T_{IN_1}, T_{IN_2}, T_{IN_3}, T_{ID_1}, T_{ID_2}]$$

$$s_1 = \{RRC\,Con.\,mode, UE\,Battery\,Life\}$$

REPLAY BUFFER 602B ↔ RRC-IDLE AND RRC-INACTIVE DRL AGENT 604B

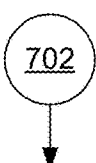

702

TRAINING AND MAINTAINING A FIRST DEEP REINFORCEMENT LEARNING MODEL, WHEREIN THE FIRST DEEP REINFORCEMENT LEARNING MODEL WAS GENERATED ACCORDING TO A FIRST OBJECTIVE TO IMPROVE TIMING OF TRANSITIONS FROM A RADIO RESOURCE CONTROL ACTIVE STATE TO A RADIO RESOURCE CONTROL INACTIVE STATE OR A RADIO RESOURCE CONTROL IDLE STATE 704

TRAINING AND MAINTAINING A SECOND DEEP REINFORCEMENT LEARNING MODEL, WHEREIN THE SECOND DEEP REINFORCEMENT LEARNING MODEL WAS GENERATED ACCORDING TO A SECOND OBJECTIVE TO IMPROVE TIMING OF TRANSITIONS FROM THE RADIO RESOURCE CONTROL INACTIVE STATE OR THE RADIO RESOURCE CONTROL IDLE STATE TO THE RADIO RESOURCE CONTROL ACTIVE STATE, AND WHEREIN THE FIRST DEEP REINFORCEMENT LEARNING MODEL AND THE SECOND DEEP REINFORCEMENT LEARNING MODEL SHARE AN OBJECTIVE FUNCTION 706

DETERMINING RESPECTIVE TIMERS FOR RESPECTIVE RADIO RESOURCE CONTROL STATES BASED ON A FIRST RESULT OF THE TRAINING OF THE FIRST DEEP REINFORCEMENT LEARNING MODEL AND A SECOND RESULT OF THE TRAINING OF THE SECOND DEEP REINFORCEMENT LEARNING MODEL, THE RESPECTIVE RADIO RESOURCE CONTROL STATES COMPRISING THE RADIO RESOURCE CONTROL INACTIVE STATE, THE RADIO RESOURCE CONTROL IDLE STATE, AND THE RADIO RESOURCE CONTROL ACTIVE STATE 708

AS PART OF BROADBAND CELLULAR COMMUNICATIONS WITH A USER EQUIPMENT, TRANSITIONING THE USER EQUIPMENT BETWEEN TWO OF, OR AMONG THREE OF, THE RESPECTIVE RADIO RESOURCE CONTROL STATES BASED ON THE RESPECTIVE TIMERS 710

800

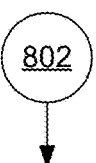

802

OPERATING A FIRST DEEP REINFORCEMENT LEARNING MODEL, WHEREIN THE FIRST DEEP REINFORCEMENT LEARNING MODEL IS TRAINED TO HAVE A FIRST OBJECTIVE TO IMPROVE TIMING OF TRANSITIONS FROM A HIGHER POWER STATE TO A LOWER POWER STATE HAVING A LOWER POWER THAN THE HIGHER POWER STATE 804

OPERATING A SECOND DEEP REINFORCEMENT LEARNING MODEL, WHEREIN THE SECOND DEEP REINFORCEMENT LEARNING MODEL IS TRAINED TO HAVE A SECOND OBJECTIVE TO IMPROVE TIMING OF TRANSITIONS FROM THE LOWER POWER STATE TO THE HIGHER POWER STATE, AND WHEREIN THE FIRST DEEP REINFORCEMENT LEARNING MODEL AND THE SECOND DEEP REINFORCEMENT LEARNING MODEL SHARE AN OBJECTIVE FUNCTION 806

DETERMINING RESPECTIVE TIMERS FOR RESPECTIVE RADIO RESOURCE CONTROL STATES BASED ON THE FIRST DEEP REINFORCEMENT LEARNING MODEL AND THE SECOND DEEP REINFORCEMENT LEARNING MODEL, THE RESPECTIVE RADIO RESOURCE CONTROL STATES COMPRISING THE LOWER POWER STATE AND THE HIGHER POWER STATE 808

TRANSITIONING A USER EQUIPMENT BETWEEN THE RESPECTIVE RADIO RESOURCE CONTROL STATES BASED ON THE RESPECTIVE TIMERS 810

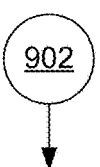

902

DETERMINING RESPECTIVE TIMERS FOR RESPECTIVE RADIO RESOURCE CONTROL STATES BASED ON A FIRST DEEP REINFORCEMENT LEARNING MODEL AND A SECOND DEEP REINFORCEMENT LEARNING MODEL, WHEREIN THE FIRST DEEP REINFORCEMENT LEARNING MODEL HAS A FIRST OBJECTIVE TO IMPROVE TIMING OF TRANSITIONS FROM A HIGHER POWER STATE TO A LOWER POWER STATE, WHEREIN THE SECOND DEEP REINFORCEMENT LEARNING MODEL HAS A SECOND OBJECTIVE TO IMPROVE TIMING OF TRANSITIONS FROM THE LOWER POWER STATE TO THE HIGHER POWER STATE, AND WHEREIN THE FIRST DEEP REINFORCEMENT LEARNING MODEL AND THE SECOND DEEP REINFORCEMENT LEARNING MODEL SHARE AN OBJECTIVE FUNCTION 904

TRANSITIONING A USER EQUIPMENT BETWEEN THE RESPECTIVE RADIO RESOURCE CONTROL STATES BASED ON THE RESPECTIVE TIMERS 906

PROCESSING
UNIT — 1004

1008    1006

SYSTEM
MEMORY

1012

RAM

1010

ROM

1024

INTERFACE

HDD — 1014

1026

INTERFACE

EXTERNAL
STORAGE — 1016

BUS

1028

INTERFACE

1020

OPTICAL
DRIVE

1022

DISK

1046

MONITOR

1048

VIDEO
ADAPTOR (WIRED/WIRELESS)

1038

KEYBOARD

1040

TOUCH
SCREEN

1044

INPUT
DEVICE
INTERFACE

1042

MOUSE

1060

MODEM

1056

WAN

1050

REMOTE
COMPUTER(S)

1058

NETWORK
ADAPTOR (WIRED/WIRELESS)

1054

LAN

1052

MEMORY/
STORAGE

1030

OPERATING SYSTEM

1032

APPLICATIONS

1034

MODULES

1036

DATA

CONFIGURING RADIO RESOURCE CONTROL TIMERS

BACKGROUND

User equipment (UE) can transition between states (e.g., active, inactive, and idle) based on timers.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can train and maintain a first deep reinforcement learning model, wherein the first deep reinforcement learning model was generated according to a first objective to improve timing of transitions from a radio resource control active state to a radio resource control inactive state or a radio resource control idle state. The system can train and maintain a second deep reinforcement learning model, wherein the second deep reinforcement learning model was generated according to a second objective to improve timing of transitions from the radio resource control inactive state or the radio resource control idle state to the radio resource control active state, and wherein the first deep reinforcement learning model and the second deep reinforcement learning model share an objective function. The system can determine respective timers for respective radio resource control states based on a first result of the training of the first deep reinforcement learning model and a second result of the training of the second deep reinforcement learning model, the respective radio resource control states comprising the radio resource control inactive state, the radio resource control idle state, and the radio resource control active state. The system can, as part of broadband cellular communications with a user equipment, transition the user equipment between two of, or among three of, the respective radio resource control states based on the respective timers.

An example method can comprise operating, by a system comprising at least one processor, a first deep reinforcement learning model, wherein the first deep reinforcement learning model is trained to have a first objective to improve timing of transitions from a higher power state to a lower power state having a lower power than the higher power state. The method can further comprise operating, by the system, a second deep reinforcement learning model, wherein the second deep reinforcement learning model is trained to have a second objective to improve timing of transitions from the lower power state to the higher power state, and wherein the first deep reinforcement learning model and the second deep reinforcement learning model share an objective function. The method can further comprise determining, by the system, respective timers for respective radio resource control states based on the first deep reinforcement learning model and the second deep reinforcement learning model, the respective radio resource control states comprising the lower power state and the higher power state. The method can further comprise transitioning, by the system, a user equipment between the respective radio resource control states based on the respective timers.

An example non-transitory computer-readable medium can comprise instructions that, in response to execution, cause a system comprising a processor to perform operations. These operations can comprise determining, by the system, respective timers for respective radio resource control states based on a first deep reinforcement learning model and a second deep reinforcement learning model, wherein the first deep reinforcement learning model has a first objective to improve timing of transitions from a higher power state to a lower power state, wherein the second deep reinforcement learning model has a second objective to improve timing of transitions from the lower power state to the higher power state, and wherein the first deep reinforcement learning model and the second deep reinforcement learning model share an objective function. These operations can further comprise transitioning, by the system, a user equipment between the respective radio resource control states based on the respective timers.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate configuring radio resource control (RRC) timers, in accordance with an embodiment of this disclosure;

FIG. 3 illustrates an example table of timers that can facilitate configuring RRC timers, in accordance with an embodiment of this disclosure;

FIG. 4 illustrates an example table of parameters for a deep reinforcement learning (DRL) agent that is configured to process low-power states, and that can facilitate configuring RRC timers, in accordance with an embodiment of this disclosure;

FIG. 5 illustrates an example table of parameters for a DRL agent that is configured to process high-power states, and that can facilitate configuring RRC timers, in accordance with an embodiment of this disclosure;

FIG. 6 illustrates another example system architecture that can facilitate configuring RRC timers, in accordance with an embodiment of this disclosure;

FIG. 7 illustrates an example process flow that can facilitate configuring RRC timers, in accordance with an embodiment of this disclosure;

FIG. 8 illustrates another example process flow that can facilitate configuring RRC timers, in accordance with an embodiment of this disclosure;

FIG. 9 illustrates another example process flow that can facilitate configuring RRC timers, in accordance with an embodiment of this disclosure;

DETAILED DESCRIPTION

Overview

Figure 2:
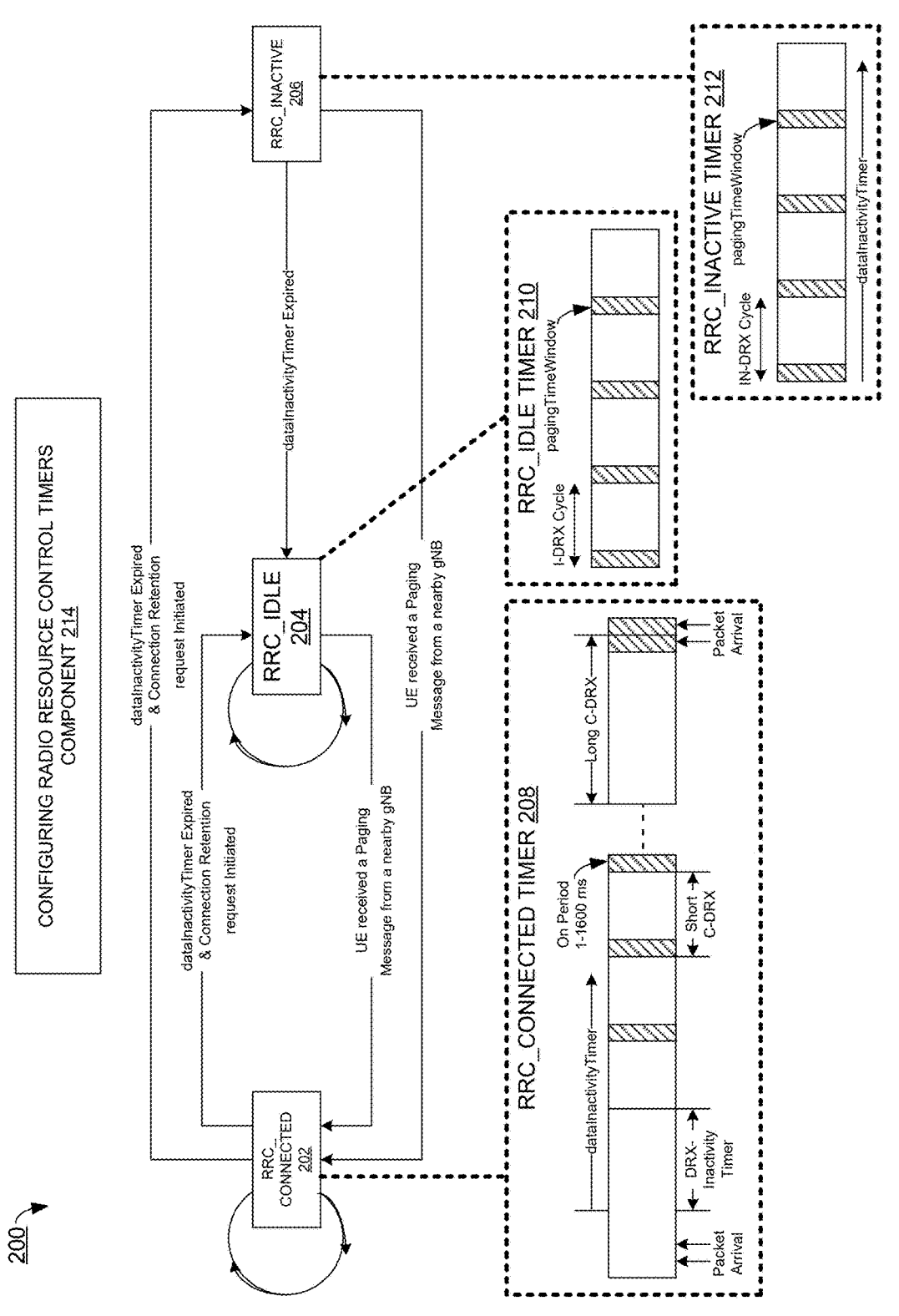
FIG. 2 illustrates an example state transition diagram that can facilitate configuring RRC timers, in accordance with an embodiment of this disclosure.

The proliferation of mobile devices can necessitate advancements in energy efficiency and network performance. In addressing this according to the present techniques, two parallel Deep Reinforcement Learning (DRL) systems can be introduced, which are aimed at optimizing the timers governing Radio Resource Control (RRC) state transitions in user equipment (UE). The present techniques can address minimizing UE power consumption, reducing delays across different RRC states, and cutting down signaling overhead-a triad of benefits for modern mobile communication.

One example DRL system according to the present techniques can be tailored to optimize a RRC active mode, learning to adjust related timers dynamically based on usage patterns and network conditions to maintain an energy-efficient yet responsive state. By identifying patterns in the data traffic and predicting user actions, this system can extend the RRC active period or transition to a lower power state just in time to save energy without compromising user experience.

Simultaneously, a second DRL system according to the present techniques can manage the transitions between the RRC-INACTIVE and RRC-IDLE modes and decide on the timers used in these two states (paging durations and inactivity timer). This system's learning approach can be designed to optimize the balance between power conservation and readiness to reconnect, ensuring that devices seamlessly resume communication with minimal delay and energy expenditure. Both DRL systems can operate in concert, guided by a global reward function that encapsulates overall performance and efficiency metrics. This reward function can be crafted to drive the optimization process, learning, and adapting to a variety of scenarios and user behaviors to provide a consistently optimized outcome. In some examples, this dual-system approach not only reduces the power consumption of UEs significantly, leading to longer battery life, but also decreases the latency involved in reestablishing connections, and reduces the load on the network due to less-frequent state transitions. That is, the present techniques can facilitate an improvement in the efficiency of mobile communications by leveraging the power of dual DRL systems. The systems' management of RRC state timers can ensure a delicate equilibrium between power efficiency, reduced delay, and diminished signaling overhead, delineating a path towards more sustainable and user-centric mobile networking technologies.

In mobile communications, it can be that UE manages a delicate balance between maintaining a high-quality connection to the network and conserving battery life. A Radio Resource Control (RRC) state machine in a UE can play a pivotal role in this balancing act, as it can govern the transitions between various states—RRC Connected (RRC_ACTIVE), RRC Inactive (RRC_INACTIVE), and RRC Idle (RRC_IDLE)—where each of these states offers a trade-off between connectivity and power consumption.

The present techniques can be implemented to optimize the operation of RRC state transitions through an implementation of two parallel Deep Reinforcement Learning (DRL) systems. These systems can be configured to learn and predict optimal (or sufficiently acceptable; where examples herein describe an optimal implementation, it can be appreciated that there can be examples that implement sub-optimal approaches, where these approaches are deemed to be sufficiently acceptable according to an optimality criterion) timing for state transitions to minimize power consumption, reduce connection re-establishment delays, and decrease signaling overhead between a UE and a network. By optimizing the RRC state timers, the present techniques can enhance a UE's energy efficiency while ensuring seamless communication.

Mobile devices, such as smartphones and tablets, can rely on a continuous connection with cellular networks to provide users with uninterrupted data and voice services. The RRC protocol can be a fundamental aspect of a UE that defines how a mobile device communicates and maintains its connection with the cellular network, predominantly in Long-Term Evolution (LTE) and fifth generation (5G) technologies (it can be appreciated that the present techniques can be implemented to other cellular networking technologies like fourth generation (4G) and sixth generation (6G) technologies).

The RRC states can be adaptive to the user's activity. When a device has ongoing data transmission, it can remain in an RRC_ACTIVE mode, where the battery consumption is highest (relative to other RRC states) due to a need for continuous communication with the network. Conversely, when the device has no data to send or receive, it can transition to an RRC_IDLE mode to conserve power, though it can be that it must relinquish its dedicated network resources. An intermediary state, RRC_INACTIVE, can offer a middle ground, maintaining a semi-connected state that allows quicker resumption of full connectivity compared to RRC_IDLE.

While the RRC state machine can be effective in theory, it can be that conventional static timer configurations for state transitions are not optimized for the dynamic nature of user behavior and network conditions. This can lead to suboptimal power usage, increased signaling to re-establish connections, and delays in resuming active communication after periods of inactivity.

Dynamic optimization techniques can be implemented to address these challenges, such as a DRL technique that can learn from the environment and make decisions that maximize a defined reward function. An application of DRL in the optimization of RRC state transitions can improve the efficiency and responsiveness of mobile devices.

The present techniques can leverage DRL to create a dual-system architecture that is attuned to the real-world variability of network conditions and user activity. By continuously learning and adapting, the DRL systems can be designed to foresee the optimal timing for RRC state transitions, thus providing a tailored approach to power management and network connectivity for a UE. This dynamic and intelligent system can mark an advancement in the domain of mobile communications, relative to prior approaches, offering substantial benefits for consumers, network operators, and the broader ecosystem.

By addressing the inefficiencies of current RRC state management strategies, the present techniques can be implemented to extend battery life, improve user experience by reducing delays in data transmission, and lower a signaling load on network infrastructure, culminating in a robust, adaptive, and efficient communication landscape for the modern mobile user.

EXAMPLE ARCHITECTURES, ETC.

FIG. 1 illustrates an example system architecture 100 that can facilitate configuring RRC timers, in accordance with an embodiment of this disclosure.

System architecture 100 comprises base station 102 and UE 104. In turn, base station 102 comprises RRC timers 106, configuring RRC timers component 108, active DRL agent 110, and inactive and idle DRL agent 112.

System architecture 100 presents one logical example of implementing the present techniques, and it can be appreciated that there can be other example architectures.

Figure 10:
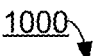
FIG. 10 illustrates an example block diagram of a computer operable to execute an embodiment of this disclosure.

Each of base station 102 and/or UE 104 can be implemented with part(s) of computing environment 1000 of FIG. 10.

Base station 102 (which can be a gNB) can maintain RRC timers 106 to determine when to transition UE 104 between various RRC states—RRC_ACTIVE, RRC_INACTIVE, and RRC_IDLE. To determine what values to use for RRC timers 106, configuring RRC timers component 108 can manage active DRL agent 110 and inactive and idle DRL agent 112 to perform deep reinforcement learning of timer values.

In some examples, a separate instance of each of active DRL agent 110 and inactive and idle DRL agent 112 can be maintained for each UE that is connected to base station 102.

In some examples, configuring RRC timers component 108 can implement part(s) of the process flows of FIGS. 7-9 to implement configuring RRC timers.

It can be appreciated that system architecture 100 is one example system architecture for configuring RRC timers, and that there can be other system architectures that facilitate configuring RRC timers.

FIG. 2 illustrates an example state transition diagram 200 that can facilitate configuring RRC timers, in accordance with an embodiment of this disclosure. In some examples, part(s) of state transition diagram 200 can be implemented by part(s) of system architecture 100 of FIG. 1 to facilitate configuring RRC timers.

State transition diagram 200 comprises RRC_CONNECTED 202 (or active), RRC_IDLE 204, RRC_INACTIVE 206, RRC_CONNECTED timer 208, RRC_IDLE timer 210, RRC_INACTIVE timer 212, and configuring RRC timers component 214 (which can be similar to configuring RRC timers component 108 of FIG. 1).

RRC_CONNECTED 202, RRC_IDLE 204, and RRC_INACTIVE 206 comprise states of state transition diagram 200. RRC_CONNECTED timer 208, RRC_IDLE timer 210, and RRC_INACTIVE timer 212 respectively correspond to RRC_CONNECTED 202, RRC_IDLE 204, and RRC_INACTIVE 206, and comprise timers that affect transitioning between the states of state transition diagram 200.

A Radio Resource Control (RRC) protocol defines the state machine that governs a connection status of a UE with the cellular network. The transitions between RRC_ACTIVE, RRC_INACTIVE, and RRC_IDLE states can be controlled by timers, and can play a role in balancing power consumption and connectivity. However, conventional RRC state management can present challenges that impact user experience, battery life, and network efficiency.

A problem with prior approaches to RRC state transitions can relate to inefficient power consumption. It can be that prior approaches to static timer configurations for RRC state transitions do not account for a dynamic nature of user behavior or a variability in network conditions. As a result, UEs can remain in the high-power RRC_ACTIVE state longer than necessary, leading to excessive energy consumption and reduced battery life. Conversely, premature transitions to lower power states can disrupt ongoing sessions, forcing the device to perform frequent and energy-intensive state reactivations.

Another problem with prior approaches to RRC state transitions can relate to connection establishment delays. Transitioning from a low power state (RRC_IDLE or RRC_INACTIVE) to an active state can introduce significant delays in data transmission, affecting time-sensitive applications such as voice over Internet Protocol (VOIP), live streaming, and real-time gaming. These delays can stem from a need to re-establish network resources and signaling paths, resulting in a suboptimal user experience.

Another problem with prior approaches to RRC state transitions can relate to signaling overhead. The RRC state transitions, particularly from RRC_IDLE to RRC_ACTIVE, can involve a considerable amount of signaling between the UE and the network. Inefficient state transitions can lead to unnecessary signaling traffic, which can not only burden the network infrastructure but also contribute to additional power consumption and latency.

Another problem with prior approaches to RRC state transitions can relate to a lack of adaptability. Static timer configurations can lack adaptability to respond to different user patterns and network contexts. The one-size-fits-all approach in prior approaches can be suboptimal, failing to recognize individual user needs or the changing network environment, which can affect both the device performance and network resource utilization.

The present techniques can address these problems with prior approaches by facilitating a dynamic optimization framework for RRC state transitions using two parallel Deep Reinforcement Learning (DRL) systems. Objectives/advantages of the present techniques can include:

Minimizing power consumption in UEs by intelligently determining an optimal duration for each RRC state based on learned patterns and predictive behavior;

Reducing connection establishment delays by adapting the RRC state transition timers, ensuring quick and efficient resumption of data transmission.

Decreasing signaling overhead through RRC state management, thereby alleviating network congestion and reducing the signaling load.

Introducing adaptability into RRC state transitions, allowing for real-time adjustments that cater to individual usage patterns and varying network conditions.

Implementing the present techniques can facilitate a more efficient and user-centric mobile network ecosystem relative to prior approaches.

FIG. 3 illustrates an example table 300 of timers that can facilitate configuring RRC timers, in accordance with an embodiment of this disclosure. In some examples, part(s) of table 300 can be implemented by part(s) of system architecture 100 of FIG. 1 to facilitate configuring RRC timers.

Table 300 comprises table 302 and configuring RRC timers component 308 (which can be similar to configuring RRC timers component 108 of FIG. 1).

The following are targeted timers that control transitions between different RRC modes:

The present techniques can facilitate an approach to modeling and optimizing Radio Resource Control (RRC) state transitions in UE, which enhances energy efficiency, reduces latency, and minimizes signaling overhead. Aspects of the present techniques can include unified metric modeling, joint objective function formulation, a dual DRL system architecture, and communication retention action optimization.

With regard to unified metric modeling, the present techniques can facilitate a unique modeling approach that quantifies per UE energy efficiency, per UE latency, and signaling overhead as a function of RRC state transition timers. Unlike prior approaches that can treat these factors in isolation or with limited interaction, the present techniques can consider relevant timers as independent variables within a single framework. This can allow for a holistic optimization that directly reflects the complex interdependencies of these metrics on the UE's RRC state management.

With regard to joint objective function formulation, a problem formulation according to the present techniques can differ from prior approaches in its consideration of RRC-related timers under a joint objective function. In some examples, his approach can offer advantages when implemented within a DRL context, where the reward function represents the combined impact of energy efficiency, latency, and signaling overhead. Such a formulation can ensure that the optimization process is not biased towards improving one metric at the expense of others, but rather enhances the overall performance of the UE in relation to the network.

by ensuring that UEs operate with maximal energy efficiency, minimal latency, and reduced signaling overhead, all harmonized under a single objective function.

A problem to be solved according to the present techniques can generally be expressed as:

$$\underset{T,\rho}{\text{argmax}} \; f(EE, La, SO, QoS \text{ measures, Throughput})$$

Subject to:

$$T_{C_2} < T_{C_3} < T_{C_4},$$

$$T_{C_1} < T_{C_5},$$

$$T_{IN2} < T_{IN1} < T_{IN3},$$

$$T_{ID2} < T_{ID1}.$$

Where, $$\overline{T} = \{T_{C_1}, T_{C_2}, T_{C_3}, T_{C_4}, T_{C_5}, T_{IN_1}, T_{IN2}, T_{IN3}, I_{ID1}, T_{ID1}\}, \text{ and}$$

$$\rho = \begin{cases} +1 \rightarrow & UE \text{ move from } RRC - \text{Active to } RRC - \text{Inacive (Retention Request)}, \\ 0 \rightarrow & \text{No transition is decided,} \quad f, \\ -1 \rightarrow & UE \text{ move from } RRC - \text{Active to } RRC - \text{Inactive (Rentention Request)}. \end{cases}$$

With regard to a dual DRL system architecture, a dual DRL system architecture according to the present techniques can be tailored to optimize RRC state transitions in varying environments. One DRL system can be dedicated to RRC_ACTIVE UEs, while the other can focus on UEs in RRC_INACTIVE and RRC_IDLE modes. This dual-system approach can facilitate a specialized and environment-specific learning process that ensures the unique conditions and challenges of each RRC state are addressed effectively. The systems can optimize a unified objective, yet they are finely tuned to the distinct characteristics of active and lower power states.

With regard to communication retention action optimization, the present techniques can add an optimization of actions related to communication retention. The decision-making process within DRL systems can not only determine an optimal timing for state transitions, but also determine whether a UE should transition to RRC-INACTIVE or RRC-IDLE. This distinction can be made because it can entail different levels of network resource retention and availability for rapid reactivation. By including this in the optimization process, the present techniques can be imple- EE: is the average energy efficiency of the UE.

La: is the average latency faced by the UE.

SO: This denotes the UE average "signaling overhead" related to RRC Mode transitions.

The present techniques can be implemented to solve this problem through two dual DRL agents.

In some examples, the presented constraints of the above problem are meant to tackle a high dependence of different timers, (e.g., short DRX<long DRX). These can be later translated into undesired actions of the DRL agent.

To have a quantitative metrices of EE, La, SO that is directly related to RRC connection states, we propose the following mathematical representations can be used.

UE average energy efficiency can be represented as follows. For battery powered UEs, longer data inactivity timers can help conserve battery life by reducing a frequency of connection establishment and release procedures. However, it can be that excessively long timers can negatively impact battery life during active sessions. A goal can be to find a balance that optimizes battery consumption without sacrificing performance. This can be mathematically represented by:

$$EE(t) = \frac{1}{\tau} \sum_{l=0}^{\tau} \frac{T_{C3}(t-l) + T_{C4}(t-l) + T_{IN1}(t-l) + T_{ID1}(t-l)}{T_{C3}(t-l) + T_{C4}(t-l) + T_{IN1}(t-l) + T_{ID1}(t-l) + T_{C5}(t-l) + T_{IN3}(t-l) + T_{C2}(t-l) + T_{IN2}(t-l) + T_{ID2}(t-l) + T_{C1}(t-l)}$$

mented to ensure that the UE's state is not only energy-efficient and responsive, but also strategically positioned for future communications, balancing immediate performance with preparedness for subsequent activity.

In summary, the present techniques can facilitate improvements RRC state transition management relative to prior approaches, by providing a comprehensive, adaptable, and forward-thinking optimization framework. The present techniques can be implemented to enhance user experience These states can be reported by UE (or overall statistics). By doing so, the DRL model can depend on actual values (timers), rather than just the configured ones.

UE average latency can be represented as follows. The UE average latency can correspond to an optimized UE experience. In the context of RRC state transitions, the latency experienced by a UE can be influenced by how quickly it can transition from a low-power state (like Idle or DRX) to an active state where it can send and receive data.

These transitions can be controlled by timers that dictate the delay in response to network requests. Accordingly, the latency as a function of RRC state transitions and their related timers can be conceptualized as follows:

$$Latency(t) \approx \frac{1}{\tau}\sum_{l=0}^{\tau} T_{tail}(t-l) + T_{drx}(t-l) + T_{other}(t-l),$$

where $T_{tail}$: is the time the UE stays in a higher-power state after data transmission due to the tail timer (also known as the inactivity timer), waiting for potential additional data to arrive before transitioning to a lower-power state.

$T_{drx}$: is the time delay introduced by the DRX cycle when the UE is in a low-power state and periodically wakes up to check for incoming data.

$T_{other}$: Includes any other delays introduced by additional timers or processes in the RRC protocol.

Accordingly, the overall UE latency can be expressed as:

$$La(t) \approx \frac{1}{\tau}\sum_{l=0}^{\tau} T_{C3}(t-l) + T_{C4}(t-l) + T_{IN1}(t-l) + T_{ID1}(t-l) +$$
$$T_{C3}(t-l) + T_{C4}(t-l) + T_{IN1}(t-l) + T_{ID1}(t-l) + T_{C5}(t-l) +$$
$$T_{IN3}(t-l) + T_{C2}(t-l) + T_{IN2}(t-l) + T_{ID2}(t-l) + T_{C1}(t-l).$$

UE average signaling overhead (that is RRC related) can be represented as follows. Short UE sleep timers can require the UE to reconnect more often than sleep timers with long periods. This signaling overhead can be primarily caused by the transitions between RRC states (e.g., RRC_IDLE to RRC_CONNECTED and vice versa) and the maintenance of the RRC_CONNECTED state. The following RRC timers-overhead metric can be used, according to the present techniques:

$$SO_{total}(t) = \frac{1}{\tau}\sum_{l=0}^{\tau} N_{transitions}(t-l)(S_{setup} + S_{teardown}) +$$
$$N_{wakeups}(t-l)(S_{paging} + S_{Control}(t-l)) + \left(\frac{1}{T_{reg}}\right)S_{reg} + N_{reports}(t-l)S_{meas},$$

Where, $N_{transitions}$: is the number of transitions from RRC_CONNECTED to (RRC_IDLE or RRC_INACTIV), $S_{setup}$: is the signaling required to establish the RRC_CONNECTED state, $S_{teardown}$: is the signaling required to release the RRC_CONNECTED state, $N_{wakeups}$: is the number of DRX wake-ups, $S_{paging}$: is the signaling involved in paging the UE, $S_{control}$: is the control signaling to maintain synchronization, $T_{reg}$: is the periodic registration timer, $S_{reg}$: is the signaling cost per registration update, $N_{reports}$: is the number of measurement reports sent within a given time frame, $S_{meas}$: is the signaling cost per measurement report.

An example system that implements the present techniques can be implemented as follows. Such a system can be built upon a dual DRL architecture that works in tandem with radio access network (RAN) components (of an open radio access network (O-RAN architecture) to optimize the RRC state transitions in a UE. This system can focus on improving energy efficiency, reducing latency, and minimizing signaling overhead through intelligent decision-making techniques.

A dual DRL system can comprise two separate but interconnected reinforcement learning agents, each tailored to handle the specific environments of different RRC states.

FIG. 4 illustrates an example table 400 of parameters for a DRL agent that is configured to process low-power states, and that can facilitate configuring RRC timers, in accordance with an embodiment of this disclosure. In some examples, part(s) of table 400 can be implemented by part(s) of system architecture 100 of FIG. 1 to facilitate configuring RRC timers.

Table 400 comprises table 402 and configuring RRC timers component 408 (which can be similar to configuring RRC timers component 108 of FIG. 1).

A DRL System for RRC_INACTIVE and RRC-IDLE UEs (low power agents) can be implemented as follows. A low power UE agent objective can be to optimize different RRC-related timers while in an RRC-INACTIVE or RRC-IDLE mode. This agent can also optimize a decision to move a UE from an RRC-INACTIVE mode into an RRC-IDLE mode. Table 400 can illustrate design parameters related to this DRL subsystem.

In some examples, a current UE battery level can be continuously reported to the gNB through MAC CE messaging. In other examples, this information can be reported directly to an offline training server as a payload that is transmitted to the UPF of the CN, without having to pass through gNB, at the baseband level.

FIG. 5 illustrates an example table 500 of parameters for a DRL agent that is configured to process high-power states, and that can facilitate configuring RRC timers, in accordance with an embodiment of this disclosure. In some examples, part(s) of table 500 can be implemented by part(s) of system architecture 100 of FIG. 1 to facilitate configuring RRC timers.

Table 500 comprises table 502 and configuring RRC timers component 508 (which can be similar to configuring RRC timers component 108 of FIG. 1).

A DRL System for RRC_ACTIVE UEs (active agent) can be implemented as follows. An active agent objective can be to optimize transitions from RRC_ACTIVE to lower power states, ensuring that power consumption is minimized without compromising latency or increasing signaling overhead unduly. Table 500 can illustrate design parameters related to this DRL subsystem.

FIG. 6 illustrates another example system architecture 600 that can facilitate configuring RRC timers, in accordance with an embodiment of this disclosure. In some examples, part(s) of system architecture 600 can be implemented by part(s) of system architecture 100 of FIG. 1 to facilitate configuring RRC timers.

System architecture 600 comprises replay buffer 602A, replay buffer 602B, RRC-ACTIVE DRL agent 604A, RRC-IDLE and RRC-INACTIVE DRL agent 604B, system environment 606, combined rewards 608, and combined states 610.

In some examples, the following RAN components can be utilized in conjunction with the present techniques. A gNodeB (gNB) can comprise a base station for LTE and 5G technologies, and can be configured to collect real-time data on a UE's RRC state, signal quality, network load, and other contextual information utilized by the DRL systems.

A mobility management entity (MME)/access and mobility management function (AMF) component can manage UE context and states, providing historical data and patterns required for the state space of the DRL systems.

A user plane function (UPF) can manage user data that can be used to derive traffic patterns and data flow characteristics, informing the state space for the DRL systems.

A training and inference process for the DRL systems can be carried out using historical data and simulations to ensure that the agents can generalize across different network conditions and UE behaviors. The inference process can occur in real-time, with the DRL agents deployed either on the UE or within the network infrastructure, leveraging data (e.g., the latest data) from RAN components to make timely decisions.

A synergy between the dual DRL system and the RAN components can ensure a comprehensive optimization of the RRC state transitions. By continuously learning and adapting to the changing network environment and UE behavior, the system can provide a robust solution that improves the efficiency and responsiveness of mobile communication relative to prior approaches.

There are various prior approaches in this area. When it comes to setting the RRC-related timers, there are suboptimal techniques according to the prior approaches.

There are prior approaches that utilize fixed timer values. In this approach, an operator can set up different timers as a configuration parameter, and keep them fixed during the whole operation time. Advantages of this approach can include simplicity in implementation and operation; predictable behavior of the UE in terms of state transitions; and it can be easy to standardize across the network, ensuring uniform policies. Disadvantages of this approach can include a failure to be adaptive to changing network conditions or user behavior, and it can lead to suboptimal use of resources, with either too much energy consumption (if the timer is too long) or excessive signaling (if the timer is too short).

There are prior approaches that utilize load-based dynamic adjustment. Advantages of this approach an include adaptability to the current network load, which can optimize resource usage; a reduction of unnecessary signaling in the network during low-traffic periods; and a potential to improve battery life for UEs by avoiding frequent state transitions during quiet periods. Disadvantages of this approach can include a possible need to use complex algorithms to predict load and adjust timers; and it can lead to a less responsive network during sudden spikes in traffic if the timers are not adjusted quickly enough.

There are prior approaches that use user behavior-based adjustment. Advantages of this approach include timers that can be adapted based on individual or group user behavior, optimizing the experience for active users; and it can improve battery life by increasing timers for UEs with infrequent data needs. Disadvantages of this approach can include a requirement of extensive data collection and analysis, potentially raising privacy concerns; and it can be that algorithms must be sophisticated to accurately predict user behavior.

There are prior approaches that use QoS-based adjustment. Advantages of this approach can include an assurance that QoS requirements are met by adjusting timers based on the service demands; and an ability to prioritize critical services by providing them with more aggressive timer settings. A disadvantage of this approach can include a possibility of leading to a less efficient use of resources for lower-priority services; and a requirement for a sophisticated understanding of the QoS needs of different services.

A DRL-based implementation according to the present techniques can have an advantage in that it does not require any training data, and it can converge to an optimal/near-optimal solution of NP-hard optimization problems.

It can be that timers are highly correlated and interdependent, so altering one affects the others. For example, at the RRC-ACTIVE, it can be that the short DRX period is greater than long DRX period. This interdependence can be managed to avoid conflicts, such as via constraints to the general problem formulation described above.

According to the present techniques, a current UE battery level can be reported (e.g., continuously reported) to the gNB through Medium Access Control Control Element (MAC CE) messages. UE battery level can also be reported directly to an offline training server as a payload that is transmitted to a user plane function (UPF) of the core network (CN), without having to pass through a gNB at a baseband level.

EXAMPLE PROCESS FLOWS

FIG. 7 illustrates an example process flow 700 that can facilitate configuring RRC timers, in accordance with an embodiment of this disclosure. In some examples, one or more embodiments of process flow 700 can be implemented by configuring RRC timers component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 or FIG. 9.

Process flow 700 begins with 702, and moves to operation 704.

Operation 704 depicts training and maintaining a first deep reinforcement learning model, wherein the first deep reinforcement learning model was generated according to a first objective to improve timing of transitions from a radio resource control active state to a radio resource control inactive state or a radio resource control idle state. This first DRL model can be active DRL agent 110 of FIG. 1.

In some examples, achieving the first objective using the first deep reinforcement learning model comprises application of a combination of at least two of a penalty associated with an average latency faced by the user equipment, an average energy efficiency of the user equipment, an average signaling overhead related to radio resource control mode transitions of the user equipment, a throughput of the user equipment, or a quality of service to be maintained for the user equipment. In some examples, the achieving of the first objective using the first deep reinforcement learning model comprises the application of a weighted combination of at least two of a first weighting of the penalty associated with the average latency faced by the user equipment, a second weighting of the average energy efficiency of the user equipment, a third weighting of the average signaling overhead related to the radio resource control mode transitions of the user equipment, a fourth weighting of the throughput of the user equipment, or a fifth weighting of the quality of service to be maintained for the user equipment. That is, a reward function of the first DRL model can be:

$$r_2=c_1[w_1(-La \text{ Penalty})+w_2(EE \text{ Improvement})+w_3(-$$
$$SO \text{ Penalty})]+c_2[y_1(\text{QOSMaintenance})+w_2(UE$$
$$\text{Throughput})]$$

$$=c_1r_1+c_2[y_1(\text{QOSMaintenance})+y_2(UE \text{ Throughput})]$$

In some examples, the first deep reinforcement learning model comprises a deep Q-network model or a proximal policy optimization model. That is, deep Q-networks (DQN) or proximal policy optimization (PPO) can be used for the first DRL model.

After operation 704, process flow 700 moves to operation 706.

Operation 706 depicts training and maintaining a second deep reinforcement learning model, wherein the second deep reinforcement learning model was generated according to a second objective to improve timing of transitions from the radio resource control inactive state or the radio resource control idle state to the radio resource control active state, and wherein the first deep reinforcement learning model and the second deep reinforcement learning model share an objective function. This second DRL model can be inactive and idle DRL agent 112 of FIG. 1.

In some examples, achieving the second objective using the second deep reinforcement learning model comprises application of a combination of at least two of a penalty associated with an average latency faced by the user equipment, an average energy efficiency of the user equipment, or an average signaling overhead related to radio resource control mode transitions of the user equipment. In some examples, the achieving of the second objective using the second deep reinforcement learning model comprises the application of a weighted combination of at least two of a first weighting of the penalty associated with the average latency faced by the user equipment, a second weighting of the average energy efficiency of the user equipment, or a third weighting of the average signaling overhead related to the radio resource control mode transitions of the user equipment. That is, a reward function of the second DRL model can be:

$$r_1=w_1(-La \text{ Penalty})+w_2(EE \text{ Improvement})+w_3(-SO$$
$$\text{Penalty})$$

In some examples, the second deep reinforcement learning model comprises an actor-critic model. That is, actor-critic approaches such as asynchronous advantage actor-critic (A3C) or soft-actor critic (SAC) can be used for the second DRL model over the timing of transitions.

In some examples, a first model type of the first deep reinforcement learning model is different from a second model type of the second deep reinforcement learning model. That is, the two DRL models can use different algorithms, such as a DQN or PPO approach for the first DRL model, and an A3C or SAC approach can be used for the second DRL model.

After operation 706, process flow 700 moves to operation 708.

Operation 708 depicts determining respective timers for respective radio resource control states based on a first result of the training of the first deep reinforcement learning model and a second result of the training of the second deep reinforcement learning model, the respective radio resource control states comprising the radio resource control inactive state, the radio resource control idle state, and the radio resource control active state. These timers can be RRC timers 106 of FIG. 1.

After operation 708, process flow 700 moves to operation 710.

Operation 710 depicts, as part of broadband cellular communications with a user equipment, transitioning the user equipment between two of, or among three of, the respective radio resource control states based on the respective timers. Using the example of FIG. 1, as UE 104 communicates with base station 102, base station 102 can transition UE 104 between RRC states based on values of RRC timers 106.

After operation 710, process flow 700 moves to 712, where process flow 700 ends.

FIG. 8 illustrates an example process flow 800 that can facilitate configuring RRC timers, in accordance with an embodiment of this disclosure. In some examples, one or more embodiments of process flow 800 can be implemented by configuring RRC timers component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 or FIG. 9.

Process flow 800 begins with 802, and moves to operation 804.

Operation 804 depicts operating a first deep reinforcement learning model, wherein the first deep reinforcement learning model is trained to have a first objective to improve timing of transitions from a higher power state to a lower power state having a lower power than the higher power state. In some examples, operation 804 can be implemented in a similar manner as operation 704 of FIG. 7.

In some examples, the user equipment being in the higher power state comprises the user equipment being in a radio resource control active state. That is, the higher power state can be RRC_ACTIVE.

In some examples, the user equipment being in the lower power state comprises the user equipment being in a radio resource control inactive state or a radio resource control idle state. That is, the lower power state can be RRC_I-NACTIVE or RRC_IDLE.

In some examples, an activation function of the first deep reinforcement learning model comprises a rectified linear unit. That is, in some examples, the first DRL model can use ReLUs or leaky ReLUs for hidden layers.

In some examples, a state space of the first deep reinforcement learning model comprises the respective radio resource control states and respective indications of battery life of the user equipment. That is, the state space can be:
{RRC Con.mode, UE Battery Life}

After operation 804, process flow 800 moves to operation 806.

Operation 806 depicts operating a second deep reinforcement learning model, wherein the second deep reinforcement learning model is trained to have a second objective to improve timing of transitions from the lower power state to the higher power state, and wherein the first deep reinforcement learning model and the second deep reinforcement learning model share an objective function. In some examples, operation 806 can be implemented in a similar manner as operation 706 of FIG. 7.

In some examples, an activation function of the second deep reinforcement learning model comprises an advanced activation function. In some examples, these advanced activation functions can capture nuances of low-power state transitions.

In some examples, a state space of the second deep reinforcement learning model comprises the respective radio resource control states and respective indications of battery life of the user equipment. That is, the state space can be:

{RRC Con.mode, UE Battery Life}

After operation 806, process flow 800 moves to operation 808.

Operation 808 depicts determining respective timers for respective radio resource control states based on the first deep reinforcement learning model and the second deep reinforcement learning model, the respective radio resource control states comprising the lower power state and the higher power state. In some examples, operation 808 can be implemented in a similar manner as operation 708 of FIG. 7.

After operation 808, process flow 800 moves to operation 810.

Operation 810 depicts transitioning a user equipment between the respective radio resource control states based on the respective timers. In some examples, operation 810 can be implemented in a similar manner as operation 710 of FIG. 7.

After operation 810, process flow 800 moves to 812, where process flow 800 ends.

FIG. 9 illustrates an example process flow 900 that can facilitate configuring RRC timers, in accordance with an embodiment of this disclosure. In some examples, one or more embodiments of process flow 900 can be implemented by configuring RRC timers component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 or FIG. 8.

Process flow 900 begins with 902, and moves to operation 904.

Operation 904 depicts determining respective timers for respective radio resource control states based on a first deep reinforcement learning model and a second deep reinforcement learning model, wherein the first deep reinforcement learning model has a first objective to improve timing of transitions from a higher power state to a lower power state, wherein the second deep reinforcement learning model has a second objective to improve timing of transitions from the lower power state to the higher power state, and wherein the first deep reinforcement learning model and the second deep reinforcement learning model share an objective function. In some examples, operation 904 can be implemented in a similar manner as operations 704-708 of FIG. 7.

In some examples, the first deep reinforcement learning model is configured to utilize a first replay buffer in achieving the first objective, and the second deep reinforcement learning model is configured to utilize a second replay buffer in achieving the second objective. That is, using the example of FIG. 6, the first replay buffer can be replay buffer 602A and the second replay buffer can be replay buffer 602B.

In some examples, the first objective comprises a metric of average energy efficiency of the user equipment, and wherein the metric of the average energy efficiency of the user equipment comprises is a function of at least two values selected from a group of values, the group of values comprising: a first value representative of a minimum periodicity at which the user equipment is determined to wake to monitor for incoming downlink data, a second value representative of a first periodicity at which the user equipment wakes after short discontinuous transmission cycles expire with no data, a third value representative of a second periodicity at which the user equipment wakes after a discontinuous transmission period to monitor for paging messages, a fourth value representative of how long the user equipment is permitted to power down between discontinuous transmission cycles, a fifth value representative of a first timer that indicates a first transition to the lower power state due to data inactivity, a sixth value representative of a second timer that indicates a second transition to an inactive state of the lower power state to an idle state of the lower power state due to continued data inactivity after a defined period of data inactivity has expired, a seventh value representative of a time duration at which to wake the user equipment to receive a physical downlink control channel scrambled paging radio network temporary identifier message, an eighth value representative of a paging monitoring window in which the user equipment monitors for paging messages, and a ninth value representative of a third timer that indicates inactivity by the user equipment after receiving a physical downlink control channel message. This can be expressed as:

$$EE(t) =$$
$$\frac{1}{\tau}\sum_{l=0}^{\tau} \frac{T_{C3}(t-l) + T_{C4}(t-l) + T_{IN1}(t-l) + T_{ID1}(t-l)}{T_{C3}(t-l) + T_{C4}(t-l) + T_{IN1}(t-l) + T_{ID1}(t-l) + T_{C5}(t-l) + T_{IN3}(t-l) + T_{C2}(t-l) + T_{IN2}(t-l) + T_{ID2}(t-l) + T_{C1}(t-l)}$$

In some examples, the first objective comprises a metric of average latency associated with user equipment, and the metric of average latency associated with user equipment is a function of at least two values selected from a group of values, the group of values comprising a first value representative of an amount of time that the user equipment stays in the higher power state after data transmission to wait for additional data to arrive before transitioning to the lower power state, a second value representative of a time delay resulting from a discontinuous transmission cycle when the user equipment is in the lower power state and periodically wakes to check for incoming data, and a third value representative of a delay resulting from a timer specified by a radio resource control protocol. This can be expressed as:

$$Latency(t) \approx \frac{1}{\tau}\sum_{l=0}^{\tau} T_{tail}(t-l) + T_{drx}(t-l) + T_{other}(t-l),$$

In some examples, the first objective comprises a metric of average signaling overhead associated with user equipment, and wherein the metric of average signaling overhead associated with user equipment is a function of at least two values selected from a group of values, the group of values comprising: a first value representative of a number of transitions from the higher power state to the lower power state for the user equipment, a second value representative of a first amount of signaling involved in establishing the higher power state by the user equipment, a third value representative of a second amount of signaling involved in releasing the higher power state by the user equipment, a fourth value representative of a number of discontinuous transmission wake ups applicable to the user equipment, a fifth value representative of a third amount of signaling involved in paging the user equipment, a sixth value representative of a fourth amount of signaling involved in the user equipment maintaining synchronization, a seventh value representative of a periodic registration timer applicable to the user equipment, an eighth value representative of a first signaling cost per registration update applicable to the user equipment, a ninth value representative of a number of measurement reports sent by the user equipment within a time period, and a tenth value of a second signaling cost per measurement report applicable to the user equipment. This can be expressed as:

$$SO_{total}(t) = \frac{1}{\tau}\sum_{l=0}^{\tau} N_{transitions}(t-l)(S_{setup} + S_{teardown}) +$$

$$N_{wakeups}(t-l)(S_{paging} + S_{Control}(t-l)) + \left(\frac{1}{T_{reg}}\right)S_{reg} + N_{reports}(t-l)S_{meas}$$

After operation 904, process flow 900 moves to operation 906.

Operation 906 depicts transitioning a user equipment between the respective radio resource control states based on the respective timers. In some examples, operation 906 can be implemented in a similar manner as operation 710 of FIG. 7.

After operation 906, process flow 800 moves to 908, where process flow 900 ends.

EXAMPLE OPERATING ENVIRONMENT

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of base station 102 and/or UE 104.

In some examples, computing environment 1000 can implement one or more embodiments of the process flows of FIGS. 7-9 to facilitate configuring RRC timers.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      training and maintaining a first deep reinforcement learning model, wherein the first deep reinforcement learning model was generated according to a first objective to improve timing of transitions from a radio resource control active state to a radio resource control inactive state or a radio resource control idle state;
      training and maintaining a second deep reinforcement learning model, wherein the second deep reinforcement learning model was generated according to a second objective to improve timing of transitions from the radio resource control inactive state or the radio resource control idle state to the radio resource control active state, and wherein the first deep reinforcement learning model and the second deep reinforcement learning model share an objective function;
      determining respective timers for respective radio resource control states based on a first result of the training of the first deep reinforcement learning model and a second result of the training of the second deep reinforcement learning model, the respective radio resource control states comprising the radio resource control inactive state, the radio resource control idle state, and the radio resource control active state; and
      as part of broadband cellular communications with a user equipment, transitioning the user equipment between two of, or among three of, the respective radio resource control states based on the respective timers.

2. The system of claim 1, wherein achieving the first objective using the first deep reinforcement learning model comprises application of a combination of at least two of a penalty associated with an average latency faced by the user equipment, an average energy efficiency of the user equipment, an average signaling overhead related to radio resource control mode transitions of the user equipment, a throughput of the user equipment, or a quality of service to be maintained for the user equipment.

3. The system of claim 2, wherein the achieving of the first objective using the first deep reinforcement learning model comprises the application of a weighted combination of at least two of a first weighting of the penalty associated with the average latency faced by the user equipment, a second weighting of the average energy efficiency of the user equipment, a third weighting of the average signaling overhead related to the radio resource control mode transitions of the user equipment, a fourth weighting of the throughput of the user equipment, or a fifth weighting of the quality of service to be maintained for the user equipment.

4. The system of claim 1, wherein achieving the second objective using the second deep reinforcement learning model comprises application of a combination of at least two of a penalty associated with an average latency faced by the user equipment, an average energy efficiency of the user equipment, or an average signaling overhead related to radio resource control mode transitions of the user equipment.

5. The system of claim 4, wherein the achieving of the second objective using the second deep reinforcement learning model comprises the application of a weighted combination of at least two of a first weighting of the penalty associated with the average latency faced by the user equipment, a second weighting of the average energy efficiency of the user equipment, or a third weighting of the average signaling overhead related to the radio resource control mode transitions of the user equipment.

6. The system of claim 1, wherein the first deep reinforcement learning model comprises a deep Q-network model or a proximal policy optimization model.

7. The system of claim 1, wherein the second deep reinforcement learning model comprises an actor-critic model.

8. The system of claim 1, wherein a first model type of the first deep reinforcement learning model is different from a second model type of the second deep reinforcement learning model.

9. A method, comprising:

operating, by a system comprising at least one processor, a first deep reinforcement learning model, wherein the first deep reinforcement learning model is trained to have a first objective to improve timing of transitions from a higher power state to a lower power state having a lower power than the higher power state;

operating, by the system, a second deep reinforcement learning model, wherein the second deep reinforcement learning model is trained to have a second objective to improve timing of transitions from the lower power state to the higher power state, and wherein the first deep reinforcement learning model and the second deep reinforcement learning model share an objective function;

determining, by the system, respective timers for respective radio resource control states based on the first deep reinforcement learning model and the second deep reinforcement learning model, the respective radio resource control states comprising the lower power state and the higher power state; and transitioning, by the system, a user equipment between the respective radio resource control states based on the respective timers.

10. The method of claim 9, wherein the user equipment being in the higher power state comprises the user equipment being in a radio resource control active state.

11. The method of claim 9, wherein the user equipment being in the lower power state comprises the user equipment being in a radio resource control inactive state or a radio resource control idle state.

12. The method of claim 9, wherein an activation function of the first deep reinforcement learning model comprises a rectified linear unit.

13. The method of claim 9, wherein an activation function of the second first deep reinforcement learning model comprises an advanced activation function.

14. The method of claim 9, wherein a state space of the first deep reinforcement learning model comprises a radio resource control active state of the respective radio resource control states, and indications of battery life of the user equipment.

15. The method of claim 9, wherein a state space of the second deep reinforcement learning model comprises a radio resource control inactive state and a radio resource control idle state of the respective radio resource control states, and indications of battery life of the user equipment.

16. A non-transitory computer-readable medium comprising instructions that, in response to execution, cause a system comprising at least one processor to perform operations, comprising:

determining, by the system, respective timers for respective radio resource control states based on a first deep reinforcement learning model and a second deep reinforcement learning model, wherein the first deep reinforcement learning model has a first objective to improve timing of transitions from a higher power state to a lower power state, wherein the second deep reinforcement learning model has a second objective to improve timing of transitions from the lower power state to the higher power state, and wherein the first deep reinforcement learning model and the second deep reinforcement learning model share an objective function; and transitioning, by the system, a user equipment between the respective radio resource control states based on the respective timers.

17. The non-transitory computer-readable medium of claim 16, wherein the first deep reinforcement learning model is configured to utilize a first replay buffer in achieving the first objective, and wherein the second deep reinforcement learning model is configured to utilize a second replay buffer in achieving the second objective.

18. The non-transitory computer-readable medium of claim 16, wherein the first objective comprises a metric of average energy efficiency of the user equipment, and wherein the metric of the average energy efficiency of the user equipment comprises is a function of at least two values selected from a group of values, the group of values comprising:

a first value representative of a minimum periodicity at which the user equipment is determined to wake to monitor for incoming downlink data, a second value representative of a first periodicity at which the user equipment wakes after short discontinuous transmission cycles expire with no data, a third value representative of a second periodicity at which the user equipment wakes after a discontinuous transmission period to monitor for paging messages, a fourth value representative of how long the user equipment is permitted to power down between discontinuous transmission cycles, a fifth value representative of a first timer that indicates a first transition to the lower power state due to data inactivity, a sixth value representative of a second timer that indicates a second transition to an inactive state of the lower power state to an idle state of the lower power state due to continued data inactivity after a defined period of data inactivity has expired, a seventh value representative of a time duration at which to wake the user equipment to receive a physical downlink control channel scrambled paging radio network temporary identifier message, an eighth value representative of a paging monitoring window in which the user equipment monitors for paging messages, and a ninth value representative of a third timer that indicates inactivity by the user equipment after receiving a physical downlink control channel message.

19. The non-transitory computer-readable medium of claim 16, wherein the first objective comprises a metric of average latency associated with user equipment, and wherein the metric of average latency associated with user equipment is a function of at least two values selected from a group of values, the group of values comprising:

a first value representative of an amount of time that the user equipment stays in the higher power state after data transmission to wait for additional data to arrive before transitioning to the lower power state, a second value representative of a time delay resulting from a discontinuous transmission cycle when the user equipment is in the lower power state and periodically wakes to check for incoming data, and a third value representative of a delay resulting from a timer specified by a radio resource control protocol.

20. The non-transitory computer-readable medium of claim 16, wherein the first objective comprises a metric of average signaling overhead associated with user equipment, and wherein the metric of average signaling overhead associated with user equipment is a function of at least two values selected from a group of values, the group of values comprising:

a first value representative of a number of transitions from the higher power state to the lower power state for the user equipment, a second value representative of a first amount of signaling involved in establishing the higher power state by the user equipment, a third value representative of a second amount of signaling involved in releasing the higher power state by the user equipment, a fourth value representative of a number of discontinuous transmission wake ups applicable to the user equipment, a fifth value representative of a third amount of signaling involved in paging the user equipment, a sixth value representative of a fourth amount of signaling involved in the user equipment maintaining synchronization, a seventh value representative of a periodic registration timer applicable to the user equipment, an eighth value representative of a first signaling cost per registration update applicable to the user equipment, a ninth value representative of a number of measurement reports sent by the user equipment within a time period, and a tenth value of a second signaling cost per measurement report applicable to the user equipment.

\*    \*    \*    \*    \*